United States Patent
Miyano (10) Patent No.: US 8,260,107 B2
(45) Date of Patent: Sep. 4, 2012

(54) DISK APPARATUS, DISK APPARATUS CONTROLLING METHOD, PROGRAM AND RECORDING MEDIUM

(75) Inventor: Toru Miyano, Kyoto (JP)

(73) Assignee: Panasonic Corporation, Osaka (JP)

( * ) Notice: Subject to any disclaimer, the term of this patent is extended or adjusted under 35 U.S.C. 154(b) by 965 days.

(21) Appl. No.: 10/528,793

(22) PCT Filed: Jan. 21, 2004

(86) PCT No.: PCT/JP2004/000457
§ 371 (c)(1),
(2), (4) Date: Mar. 23, 2005

(87) PCT Pub. No.: WO2004/066063
PCT Pub. Date: Aug. 5, 2004

(65) Prior Publication Data
US 2005/0270936 A1 Dec. 8, 2005

(30) Foreign Application Priority Data
Jan. 22, 2003 (JP) .................. 2003-013860

(51) Int. Cl.
*H04N 5/765* (2006.01)
*H04N 5/931* (2006.01)
(52) U.S. Cl. ...................... 386/200; 386/204
(58) Field of Classification Search .............. 386/46
See application file for complete search history.

(56) References Cited

U.S. PATENT DOCUMENTS

| | | | | |
|---|---|---|---|---|
| 6,466,391 | B1 * | 10/2002 | Lee et al. | 360/75 |
| 6,763,400 | B2 * | 7/2004 | Numano et al. | 710/14 |
| 6,920,090 | B2 * | 7/2005 | Shi et al. | 369/30.27 |
| 6,985,191 | B2 * | 1/2006 | Choi | 348/730 |
| 2002/0186961 | A1 * | 12/2002 | Kikuchi et al. | 386/98 |
| 2003/0137578 | A1 * | 7/2003 | Yamazaki | 347/140 |
| 2003/0163746 | A1 * | 8/2003 | Lee | 713/320 |
| 2004/0103434 | A1 * | 5/2004 | Ellis | 725/58 |

FOREIGN PATENT DOCUMENTS

| | | |
|---|---|---|
| JP | 04-060956 | 2/1992 |
| JP | 05-074038 A | 3/1993 |
| JP | 2002-109873 A | 4/2002 |
| JP | 2002-238008 A | 8/2002 |

OTHER PUBLICATIONS

Japanese Search Report for PCT/JP2004/000457, dated Jul. 20, 2004 and English translation thereof.

(Continued)

*Primary Examiner* — William C Vaughn, Jr.
*Assistant Examiner* — Oluwaseun A Adegeye
(74) *Attorney, Agent, or Firm* — RatnerPrestia (57) ABSTRACT

A disk apparatus includes a disk section, a process, section, a disk start control device, and a disk start mode setting device. At the time when power ON operation is carried out, in the case (1) when the disk start mode setting device is set in the disabling mode, the disk start control device carries out control so as to start the processing section without starting a hard disk. And in the case (2) when the disk start mode setting device is set in the enabling mode, the disk start control device carries out control to start the hard disk and the processing section.

17 Claims, 8 Drawing Sheets

OTHER PUBLICATIONS

DC-395 Series PCI SCSI Host Adapters User's Manual, Manual Rev: 3.00, Jan. 15, 1999.

"SCSI Overview—HD Jumper Settings" Internet, [Online] Jan. 13, 2001, XP002428117, URL:http://web.archive.org/web/20010113183900/http://ww.dawicontrol.com/german/html/tipll.htm>.

"SCSI-2 Spec—Direct-access devices" Internet, [Online] Apr. 19, 2001, XP002428118, URL:http://web.archive.org/web/20010419233400/http://www.scsimechanic.com/scsi/SCSI2-09.html>.

Supplementary European Search Report for Application No. EP 04 70 3896 dated Apr. 24, 2007.

* cited by examiner

DISK APPARATUS, DISK APPARATUS CONTROLLING METHOD, PROGRAM AND RECORDING MEDIUM

THIS APPLICATION IS A U.S. NATIONAL PHASE APPLICATION OF PCT INTERNATIONAL APPLICATION PCT/JP2004/000457.

TECHNICAL FIELD

The present invention relates to a disk apparatus, a disk apparatus controlling method, a program and a recording medium, capable of protecting a disk section against external impact or the like.

BACKGROUND TECHNOLOGY

Generally when electric power is supplied to a disk apparatus regardless of its installation state, its disk section is started. For example, in a hard disk apparatus equipped with a tuner, when its main power supply is set in the ON state, the tuner is started, and the disk section of the hard disk apparatus is also started. In this way, when the main power supply is set in the ON state, the disk section is started regardless of the installation state of the hard disk apparatus.

On the other hand, a method of protecting the disk section, wherein a disk head floating over the medium of the disk section is retracted to a safety zone after starting depending on the magnitude of impact detected by an acceleration sensor, has been disclosed (for example, refer to Japanese Laid-open Patent Application No. Hei 04-60956). In the case when impact is applied after starting, the disk head is retracted to the safety zone at the timing when the acceleration sensor detects this impact. In the case of a 3.5-inch magnetic disk or the like, a zone on the disk is secured as this safety zone. The entire disclosure of Japanese Laid-open Patent Application No. Hei 04-60956 is incorporated herein by reference in its entirety.

However, in such a method of protecting the disk section as described above, when the installation operation (for example, the determination of the installation position, the connection of an antenna and a monitor, the operation of receiving tuner signals, etc.) of the disk apparatus is carried out while electric power has been supplied to the disk apparatus and the disk section has been started, and if large impact is applied to the disk apparatus owing to human operation errors or the like, the disk section will be damaged, that is, an impact mark will be generated on the medium by the disk head floating over the medium of the disk section, or the disk head itself will be deteriorated, thereby causing a problem of being unable to secure the reliability of the disk section.

In other words, in the disk section having a configuration in which the safety zone of the disk head is secured on the medium, impact resistance in a state wherein the disk head is retracted to the safety zone while the disk section is started and the medium is rotated differs from that in a state wherein the disk head is retracted to the safety zone while the disk section is not started and the medium is stopped; it is general that the impact resistance in a state the medium is rotated is lower. Furthermore, the state of the disk head retracted to the safety zone is different; while the medium is rotated, the disk head floats from the medium, and while the medium is not rotated, the disk head lands on the medium.

In the case when strong impact is applied in the state wherein the disk head is retracted to the safety zone on the medium, damage to the medium becomes greater when the medium is rotating because for example the disk head makes contact with the portion corresponding to the safety zone of the medium owing to the impact and an impact mark is generated. Then, at the next movement of the disk head, scratches may be generated occasionally on the medium depending on the state of the impact mark or the behavior of chips caused by the impact mark.

Hence, in the configuration of the disk section in which the safety zone for the disk head is secured on the medium, in the state wherein the medium is rotating when the disk head is retracted to the safety zone, the frequency at which the reliability of the disk section against the impact applied at the time cannot be secured becomes high in comparison with the state wherein the medium is not rotating when the disk head is retracted to the safety zone.

In other words, the conventional disk section protecting method has a problem, that is, the reliability of the disk section cannot be secured occasionally in the case when large impact is applied during the installation operation of the disk apparatus.

In consideration of the above-mentioned problem, the present invention is intended to provide a disk apparatus, a disk apparatus controlling method, a program and a recording medium, capable of securing the reliability of the disk section even in the case when large impact is applied during the installation operation of the disk apparatus.

DISCLOSURE OF THE INVENTION

In order to solve the above-mentioned problems, the $1^{st}$ aspect of the present invention is a disk apparatus comprising:

a disk section of recording and/or reproducing at least one of video, audio and data, a processing section of processing at least one of said video, audio and data, disk start control means of controlling said disk section and said processing section, and disk start mode setting means of setting either one of the disk start disabling mode of disabling the start of said disk section and the disk start enabling mode of enabling the start of said disk section, wherein at the time when power ON operation is carried out, in the case (1) when said disk start mode setting means sets said disk start disabling mode, said disk start control means carries out control so as to start said processing section without starting said disk section, and in the case (2) when said disk start mode setting means sets said disk start enabling mode, said disk start control means carries out control so as to start said disk section and said processing section.

The $2^{nd}$ aspect of the present invention is a disk apparatus in accordance with the $1^{st}$ aspect of the present invention, wherein said disk start mode setting means is set in said disk start disabling mode in a production shipment stage.

The $3^{rd}$ aspect of the present invention is a disk apparatus in accordance with the $1^{st}$ aspect of the present invention, wherein said disk section is a hard disk of carrying out recording and/or reproduction on magnetic disk media.

The $4^{th}$ aspect of the present invention is a disk apparatus in accordance with the $3^{rd}$ aspect of the present invention, wherein the safety zone of said hard disk is present on said magnetic disk media.

The $5^{th}$ aspect of the present invention is a disk apparatus in accordance with the $1^{st}$ aspect of the present invention, wherein said processing section is a tuner of receiving broadcasting.

The 6th aspect of the present invention is a disk apparatus in accordance with the 3rd aspect of the present invention, serving as a recorder equipped with a hard disk, wherein
said processing section is a tuner of receiving broadcasting.

The 7th aspect of the present invention is a disk apparatus in accordance with the 3rd aspect of the present invention, serving as a DVD recorder equipped with a hard disk, wherein
said processing section is (1) a tuner of receiving broadcasting and (2) an optical disk section of recording and/or reproducing said broadcasting received on an optical disk.

The 8th aspect of the present invention is a disk apparatus in accordance with the 3rd aspect of the present invention, serving as a television set equipped with a hard disk, wherein said processing section is (1) a tuner of receiving broadcasting and (2) a display section of displaying said broadcasting received.

The 9th aspect of the present invention is a disk apparatus controlling method of controlling a disk apparatus comprising a disk section of recording and/or reproducing at least one of video, audio and data, a processing section of processing said video, audio and data, and disk start mode setting means of setting either one of the disk start disabling mode of disabling the start of said disk section and the disk start enabling mode of enabling the start of said disk section,
said disk apparatus controlling method comprising a control steps wherein at the time when power ON operation is carried out, in the case (1) when said disk start mode setting means sets said disk start disabling mode, control is carried out so as to start said processing section without starting said disk section, and in the case (2) when said disk start mode setting means sets said disk start enabling mode, control is carried out so as to start said disk section and said processing section.

The 10th aspect of the present invention is a program of making a computer carry out said control steps of said disk apparatus controlling method in accordance with the 9th aspect of the present invention, wherein at the time when power ON operation is carried out, in the case (1) when said disk start mode setting means sets said disk start disabling mode, control is carried out so as to start said processing section without starting said disk section, and in the case (2) when said disk start mode setting means sets said disk start enabling mode, control is carried out so as to start said disk section and said processing section.

The 11th aspect of the present invention is a recording medium holding said program in accordance with the 10th aspect of the present invention, said recording medium being processable by a computer.

EXPLANATIONS OF NUMERALS 11 key input means
12 hard disk
13 disk start control means
14 disk start mode setting means
15 nonvolatile storage medium
16 display means
17 processing section

BEST MODES FOR CARRYING OUT THE INVENTION

An embodiment in accordance with the present invention will be described below referring to the drawings.

Figure 1:
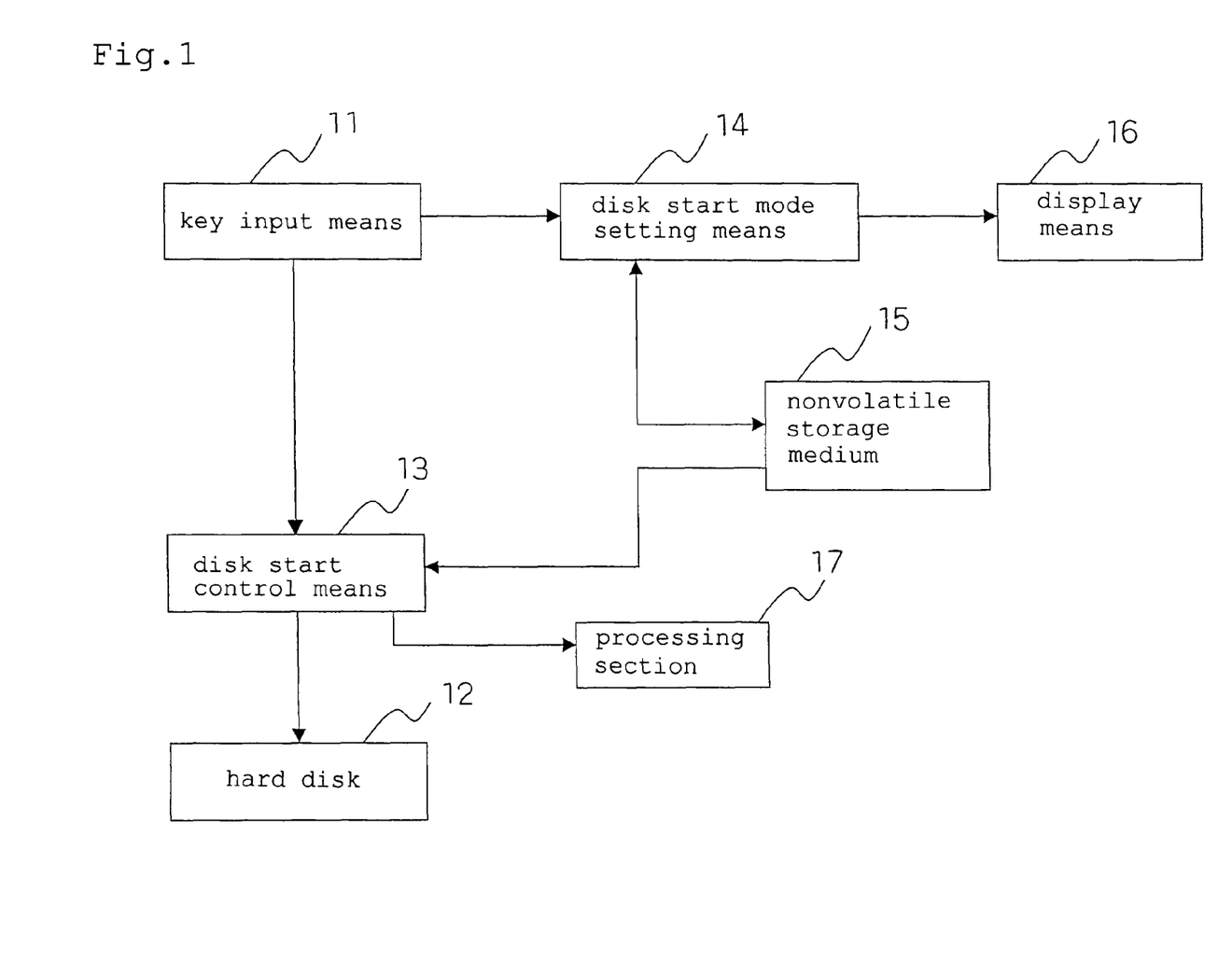
FIG. 1 is a view showing a disk apparatus in accordance with an embodiment of the present invention.

FIG. 1 is a view illustrating the configuration of a disk apparatus in accordance with the embodiment of the present invention. The configuration of the above-mentioned disk apparatus will be described below using FIG. 1.

The disk apparatus in accordance with this embodiment comprises key input means 11, a hard disk 12, disk start control means 13, disk start mode setting means 14, a nonvolatile storage medium 15, display means 16 and a processing section 17.

The key input means 11 is a means of detecting key input from a remote control, operation buttons on the main unit, etc. The hard disk 12 is a means of recording input data on magnetic disk media and reproducing data recorded on the magnetic disk media. The disk start control means 13 is a means of carrying out the start or stop operation of the hard disk 12. The disk start mode setting means 14 is a means of setting disk start enabling/disabling mode information indicating whether the start of the hard disk 12 is enabled or disabled, on the basis of the key input information input from the key input means 11. The nonvolatile storage medium 15 is a means of storing the above-mentioned disk start enabling/disabling mode information. The display means 16 is a means of displaying the above-mentioned disk start enabling/disabling mode information or carrying out display regarding operation procedures at the time when the above-mentioned disk start enabling/disabling mode information is set. The processing section 17 is a means having functions other than those of the hard disk 12, such as the function of a tuner of receiving video and audio.

The hard disk 12 in accordance with this embodiment is an example of the disk section in accordance with the present invention.

The operation of this embodiment will be described next.

First, the operation of the disk apparatus in accordance with this embodiment will be described using FIGS. 1, 2 and 3.

Figure 2:
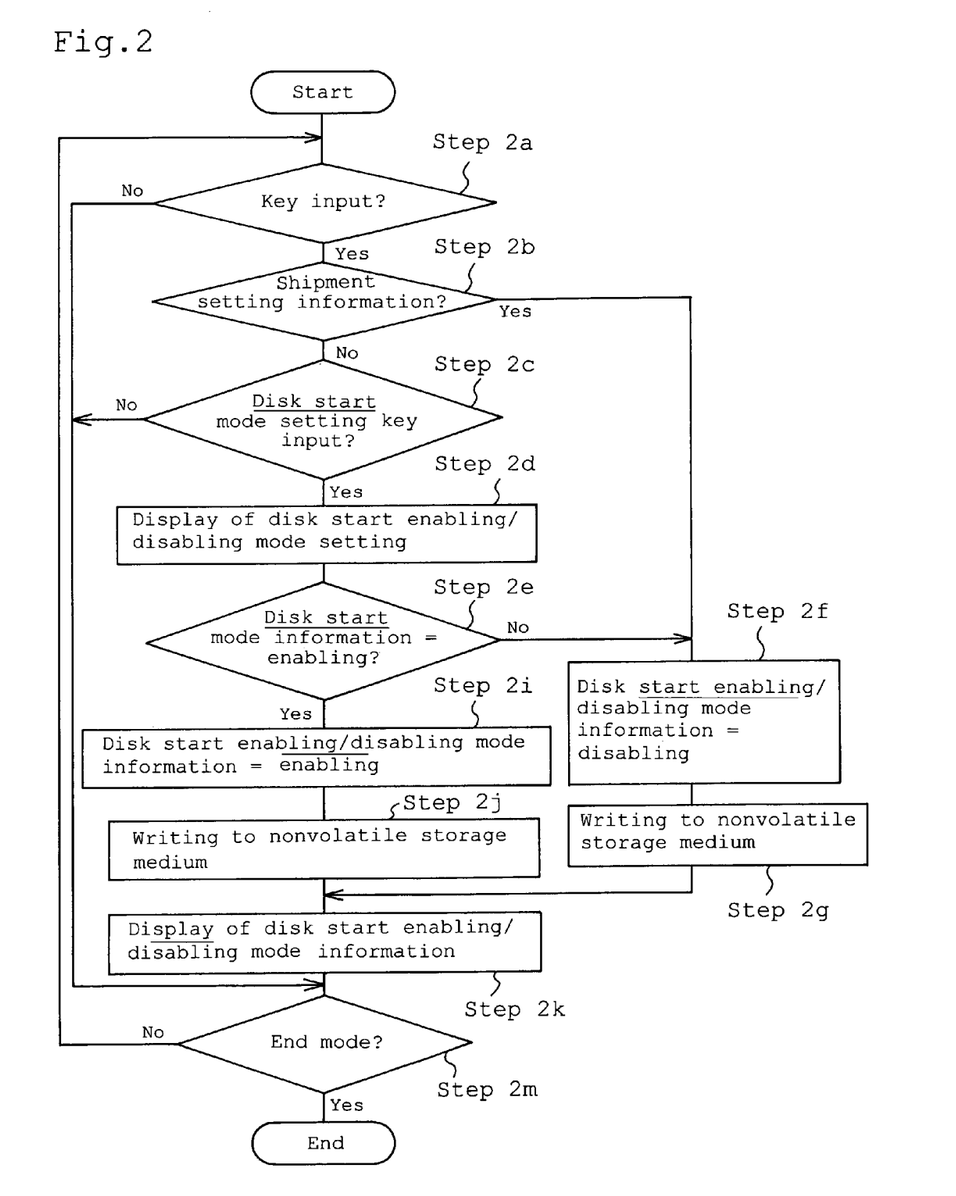
FIG. 2 is a view showing the flow of the setting operation of disk start enabling/disabling mode information in accordance with the embodiment of the present invention.
Figure 3:
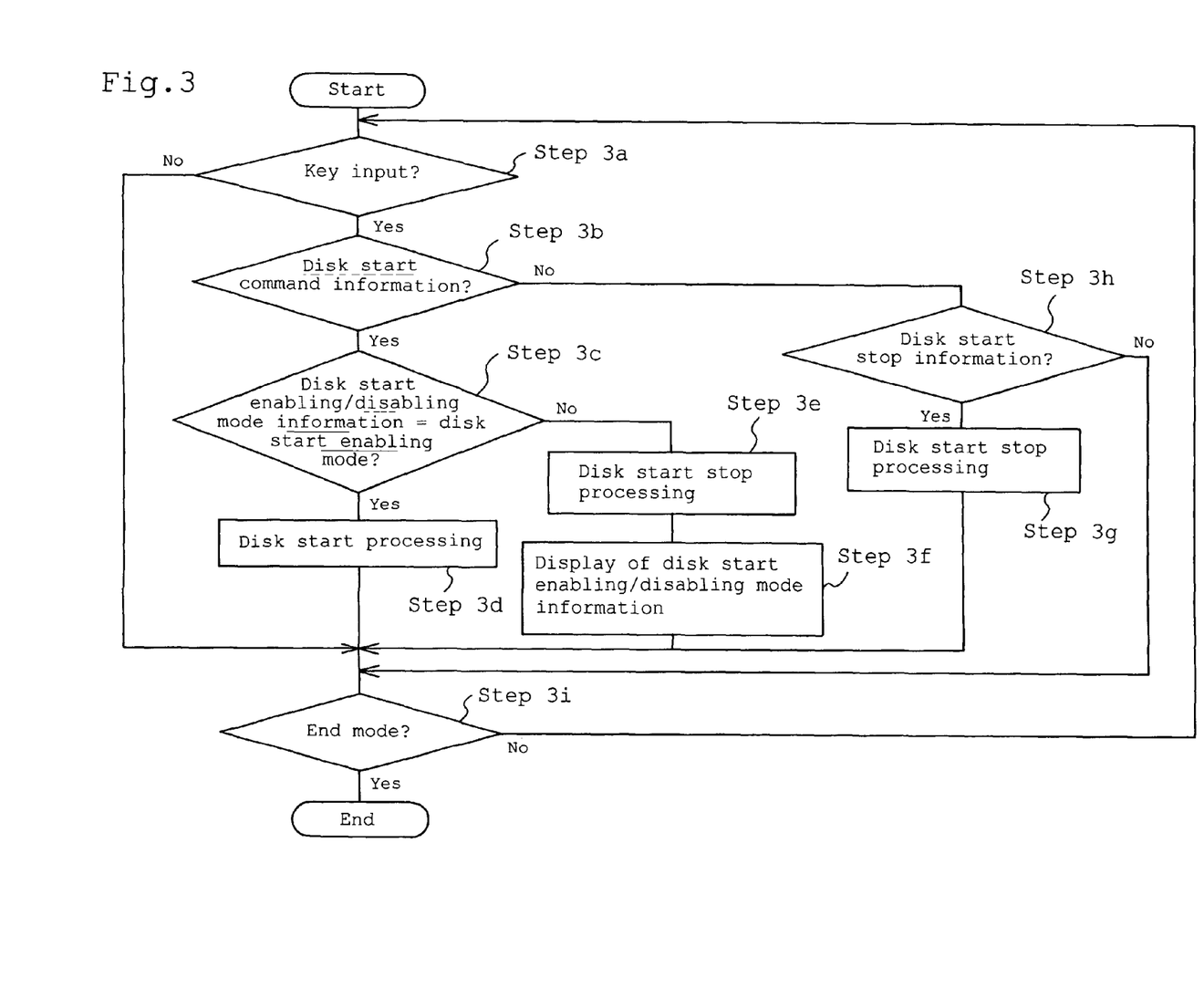
FIG. 3 is a view showing the flow of disk start and start stop operation in accordance with the embodiment of the present invention.

FIGS. 2 and 3 are the flowcharts of software of accomplishing the disk apparatus shown in FIG. 1. In other words, FIG. 2 is a flowchart showing the operation of setting the disk start enabling/disabling mode information in the disk start mode setting means 14 shown in FIG. 1, and FIG. 3 is a flowchart showing hard disk start and start stop operations in the disk start control means 13 shown in FIG. 1. The flowchart shown in FIG. 2 and the flowchart shown in FIG. 3 are configured so that the operations are carried out at the timing when the key input means 11 detects key input information, according to the type of the detected key input information.

First, when key input by the user is made, the key input means 11 detects key input information (at step 2a). In other words, at step 2a, in the case when the key input means 11 detects key input information since key input to the key input means 11 by the user is carried out, the procedure advances to step 2b. On the other hand, in the case when the key input means 11 does not detect key input information since key input to the key input means 11 by the user is not carried out at step 2a, the procedure advances to step 2m.

At step 2b, the disk start mode setting means 14 judges whether the key input information having been input is shipment setting information to be key input in a production shipment stage, for example, or not. Then, when the disk start mode setting means 14 judges that the key input information is the shipment setting information, the procedure advances to step 2f. At step 2f, the disk start mode setting means 14 forcibly sets the above-mentioned disk start enabling/disabling mode information in the disk start disabling mode, and the procedure advances to step 2g. At step 2g, the disk start mode setting means 14 stores the information on setting in the nonvolatile storage medium 15, and the procedure advances to step 2k. At step 2k the display means 16 displays the above-mentioned disk start enabling/disabling mode information for several seconds so that the user can perform confirmation when operating the disk apparatus, and the procedure advances to step 2m.

The shipment setting information is information that is key input from the key input means 11 when the disk apparatus in accordance with this embodiment is shipped from a plant. The shipment setting information may also be input by key input using the key input means 11 when the disk apparatus in accordance with this embodiment is used by the user after it was shipped from the plant as a matter of course. In other words, in the case when the shipment setting information is input and when the power supply of the disk apparatus in accordance with this embodiment is turned on again, the disk start enabling/disabling mode information is forcibly set in the disk start disabling mode.

Figure 4:
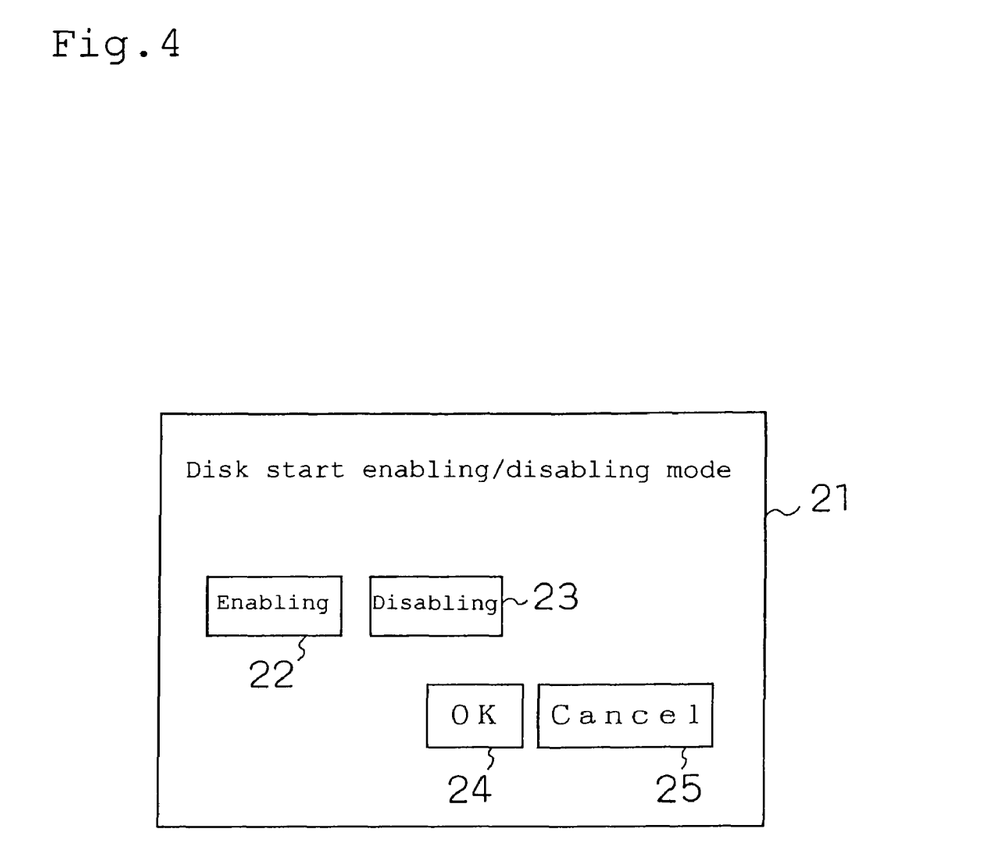
FIG. 4 is a view showing an example of a GUI for setting the disk start enabling/disabling mode information in accordance with the embodiment of the present invention.

On the other hand, in the case when the disk start mode setting means 14 judges that the information is not the shipment setting information at the above-mentioned step 2b, the means judges that the mode is the ordinary operation mode, and the procedure advances to step 2c. At step 2c, the disk start mode setting means 14 judges whether the key input information is information regarding disk start mode setting or not. In the case when the disk start mode setting means 14 judges that the key input information is information regarding disk start mode setting, the procedure advances to step 2d; in the case when the means judges that the key input information is not information regarding disk start mode setting, the procedure advances to step 2m. The information regarding disk start mode setting is herein information of setting the disk start disabling mode information. In other words, the key input information that is key input in the key input means 11 by the user according to a method predetermined to set the disk start enabling/disabling mode information is the information regarding disk start mode setting. More specifically, information obtained when a predetermined button on the operation panel or the remote control is pressed for a long time, information obtained when the button of setting the start mode is pressed, information displaying the GUI of setting the start mode, etc. are the information regarding disk start mode setting. FIG. 4 shows an example of the GUI (Graphical User Interface) 21 for setting the disk start enabling/disabling mode information. When enabling 22 is selected in FIG. 4, the "enabling mode" can be set as the disk start enabling/disabling mode information; when disabling 23 is selected, the "disabling mode" can be set as the disk start enabling/disabling mode information. Furthermore, OK 24 should only be selected to determine the mode having been set, and Cancel 25 should only be selected to cancel the setting.

At step 2d, the display means 16 displays the above-mentioned disk start enabling/disabling mode information having already been stored in the nonvolatile storage medium 15, information regarding the operation method of changing the setting of the above-mentioned disk start enabling/disabling mode information, etc. Then, when the user sets the disk start enabling/disabling mode information on the basis of the displayed information regarding the operation method of changing the setting of the above-mentioned disk start enabling/disabling mode information, the procedure advances to step 2e. At step 2e, the disk start mode setting means 14 judges the disk start enabling/disabling mode information having been set by the user. In other words, in the case when the disk start mode setting means 14 judges that the disk start enabling/disabling mode information having been set by the user is the "enabling" mode, the procedure advances to step 2i; in the case when the disk start mode setting means 14 judges that the disk start enabling/disabling mode information having been set by the user is the "disabling" mode, the procedure advances to step 2f.

At step 2i, the disk start mode setting means 14 determines the above-mentioned disk start enabling/disabling mode information as the disk start enabling mode, and the procedure advances to step 2j. At step 2j, the determined disk start enabling/disabling mode information is stored in the nonvolatile storage medium 15, and the procedure advances to step 2k. At step 2k, the display means 16 displays the above-mentioned disk start enabling/disabling mode information for several seconds for operation confirmation, and the procedure advances to step 2m.

Then, at step 2m, a judgment is made as to whether electric power necessary for carrying out the judgment of the disk start enabling/disabling mode and the judgment of the disk start stop operation is being supplied or not. In the case when it is judged that the electric power necessary for carrying out the judgment of the disk start enabling/disabling mode and the judgment of the disk start stop operation is being supplied, the procedure advances to the above-mentioned step 2a; in the case when it is not judged that such electric power is being supplied, the procedure ends.

The operation based on the flowchart shown in FIG. 2 has been described above. Next, the operation based on the flowchart shown in FIG. 3 will be described.

In FIG. 3, when key input is made, the key input means 11 detects key input information (at step 3a). In other words, at step 3a, in the case when the key input means 11 detects key input information since key input to the key input means 11 by the user is carried out, the procedure advances to step 3b. On the other hand, in the case when the key input means 11 does not detect key input information since key input to the key input means 11 by the user is not carried out at step 3a, the procedure advances to step 3i.

At step 3b, the disk start control means 13 judges whether the key input information from the key input means 11 is disk start command information to be used during ordinary operation, such as power ON or a write or read command interlocked with the power ON, or not. The disk start command information refers to a group of commands for the ordinary operation of the hard disk 12, such as power ON for ordinary recording and reproduction by the user, writing of user data into the hard disk 12, reading of user data from the hard disk 12 and deleting of user data from the hard disk 12. Furthermore, commands other than the disk start command information refer to a power OFF command for the user to turn off power and a command to forcibly stop the start of the hard disk 12. Then, in the case when the disk start control means 13 judges that the key input information is the disk start command information to be used during ordinary operation, such as the power ON or the write or read command interlocked with the power ON, the disk start control means 13 first starts the processing section 17.

Then, at step 3b, in the case when the disk start control means 13 judges that the key input information is the disk start command information to be used during ordinary operation, such as a command interlocked with the power ON, the disk start control means 13 further reads the above-mentioned disk start enabling/disabling mode information stored in the nonvolatile storage medium 15, and the procedure advances to step 3c. At step 3c, the disk start control means 13 judges whether the disk start enabling/disabling mode information is the disk start enabling mode or not. In the case when the disk start control means 13 judges that the disk start enabling/disabling mode information is the "disk start enabling mode," the procedure advances to step 3d; in the case when the judgment is negative, the procedure advances to step 3e.

At stop 3d, the disk start control means 13 carries out disk start processing for the hard disk 12, and the procedure advances to step 3i. On the other hand, at step 3e, in the case when the hard disk 12 has been started, the disk start control means 13 carries out disk start stop processing; in the case when the hard disk 12 has been stopped, the procedure directly advances to step 3f. At step 3f, the display means 16 displays, for several seconds, a message stating that the above-mentioned disk start enabling/disabling mode information is the disk start disabling mode, thereby informing the user that the state differs from the ordinary operation state, and the procedure advances to step 3i.

On the other hand, at step 3b, in the case when the disk start control means 13 judges that the key input information is not the disk start command information to be used during ordinary operation, such as a command interlocked with the power ON, the procedure advances to step 3h. At step 3h, the disk start control means 13 judges whether the information is disk start stop information or not. In the case when the disk start control means 13 judges at step 3h that the information is the disk start stop information, the procedure advances to step 3g; in the case when the judgment is negative, the procedure advances to step 3i. The disk start control means 13 analyzes the key input information to make the judgment as to whether the information is the disk start stop information or not. For example, the key input information detected by the key input means 11 in the case when the user presses a button that is provided on the operation panel or the remote control of the disk apparatus and is used to set the power supply of the disk apparatus in the OFF state is the disk start stop information.

Then, at step 3g, the disk start control means 13 carries out the disk start stop processing to stop the start of the hard disk 12, and the procedure advances to step 3i.

Then, at stop 3i, a judgment is made as to whether electric power necessary for carrying out the judgment of the disk start enabling/disabling mode and the judgment of the disk start stop operation is being supplied or not. In the case when it is judged that the electric power necessary for carrying out the judgment of the disk start enabling/disabling mode and the judgment of the disk start stop operation is being supplied, the procedure advances to step 3a; in the case when it is not judged that such electric power is being supplied, the procedure ends.

As described above, in the case when the disk start enabling/disabling mode information is the disk start enabling mode, when the power supply of the disk apparatus in accordance with this embodiment is set in the ON state, the power supply of the processing section 17 is set in the ON state, and the power supply of the hard disk 12 is also set in the ON state. Furthermore, in the case when the disk start enabling/disabling mode information is the disk start disabling mode, when the power supply of the disk apparatus in accordance with this embodiment is set in the ON state, the power supply of the processing section 17 is set in the ON state, but the power supply of the hard disk 12 remains in the OFF state. As described above, in the case when the power supply of the disk apparatus is set in the ON state, the determination as to whether the power supply of the hard disk 12 is set in the ON state or the OFF state is made according to the disk start enabling/disabling mode information.

As described above, the disk start mode setting means 14 sets either one of the disk start disabling mode wherein the start of the hard disk 12 is disabled and the disk start enabling mode wherein the start of the hard disk 12 is enabled; when power ON operation is carried out, in the case when the disk start mode setting means 14 sets the disk start disabling mode, the disk start control means 13 carries out control so as to start the processing section 17 without starting the hard disk 12, and in the case when the disk start mode setting means 14 sets the disk start enabling mode, the disk start control means 13 carries out control so as to start the hard disk 12 and the processing section 17.

The disk apparatus operates as described above; furthermore, how the disk apparatus is used will be described in time series referring to FIGS. 5 to 8.

FIGS. 5 to 8 are views showing the outlines of a power supply 31 and sections relating to the power supply 31, which are operated in a period from the time before the disk apparatus is shipped from the plant to the time when installation operation is carried out by the user in the house of the user and then the disk apparatus is actually used by the user. The disk apparatus shown in FIGS. 5 to 8 is a disk apparatus wherein when the power supply 31 is applied to the hard disk 12, a command of rotating the magnetic disk media of the hard disk 12 of the disk apparatus is issued automatically, and the magnetic disk media of the hard disk 12 rotate according to this command when the power supply 31 is applied to the hard disk 12.

In FIGS. 5 to 8, the disk apparatus has the power supply 31, a power switch 32, a switch 33 and a switch 34.

The power supply 31 is a means of supplying electric power that starts the disk apparatus. The power switch 32 is a switch that starts and stops the entire disk apparatus. The switch 33 is a circuit that switches the connection between the hard disk 12 and the power supply 31 to the conduction state or non-conduction state depending on the control by the disk start control means 13. The switch 34 is a circuit that switches the connection between the processing section 17 and the power supply 31 to the conduction state or non-conduction state depending on the control by the disk start control means 13.

Figure 5:
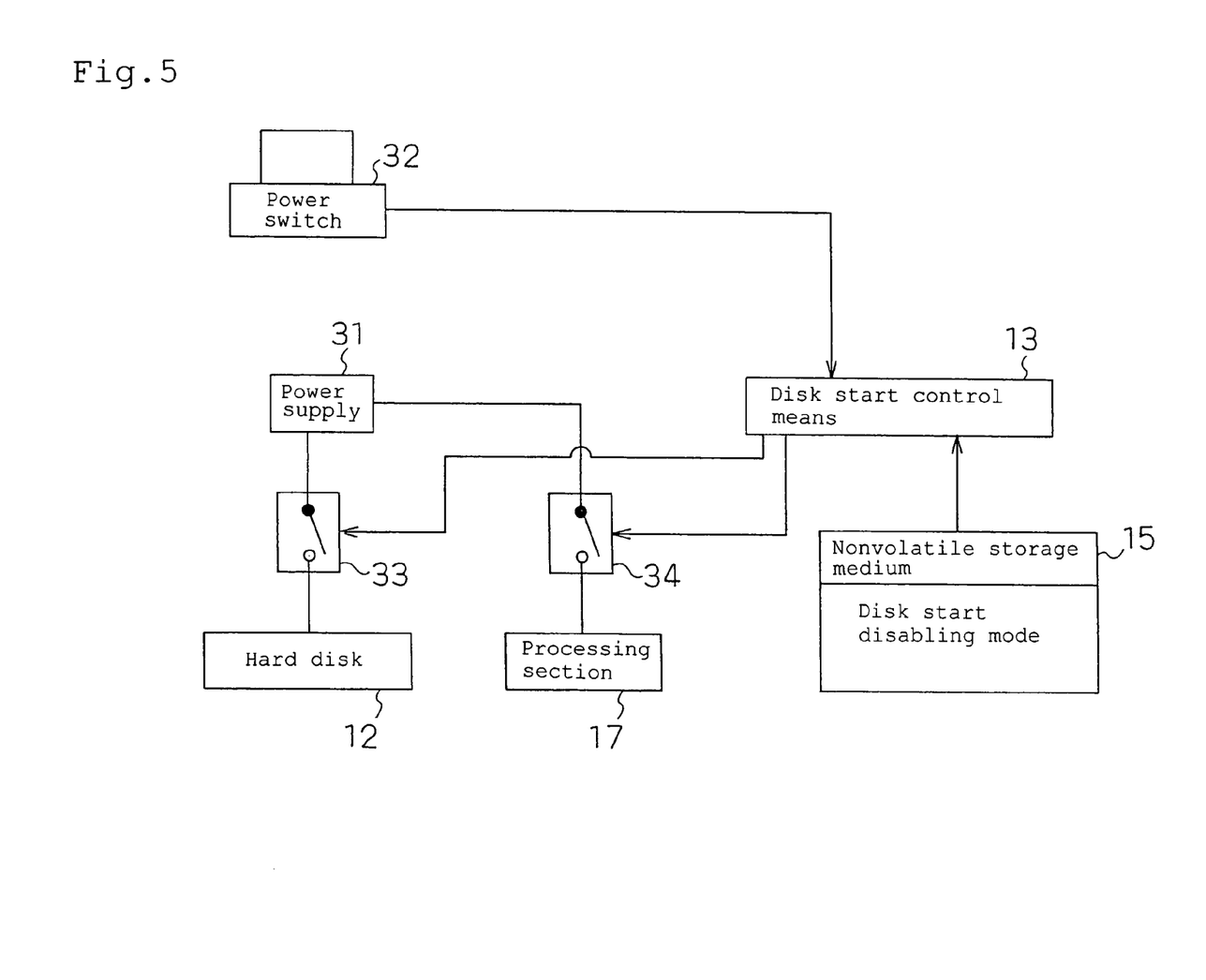
FIG. 5 is a view showing an outline of the power supply of the disk apparatus and sections relating to the power supply in accordance with the embodiment of the present invention.

First, the disk apparatus is produced in the plant. After the production, shipment setting information is input as the key input information to the key input means 11. After the shipment setting information is input to the key input means 11 of the disk apparatus, the disk start disabling mode is stored in the nonvolatile storage medium 15. FIG. 5 is a view showing the state of the disk apparatus immediately before shipment, wherein the disk start disabling mode is stored in the nonvolatile storage medium 15 of the disk apparatus. At this time, the power switch 32 is in the OFF state, and the switch 33 and the switch 34 are set in the non-conduction state. Hence, the disk apparatus shown in FIG. 5 is in the start stop state.

Figure 6:
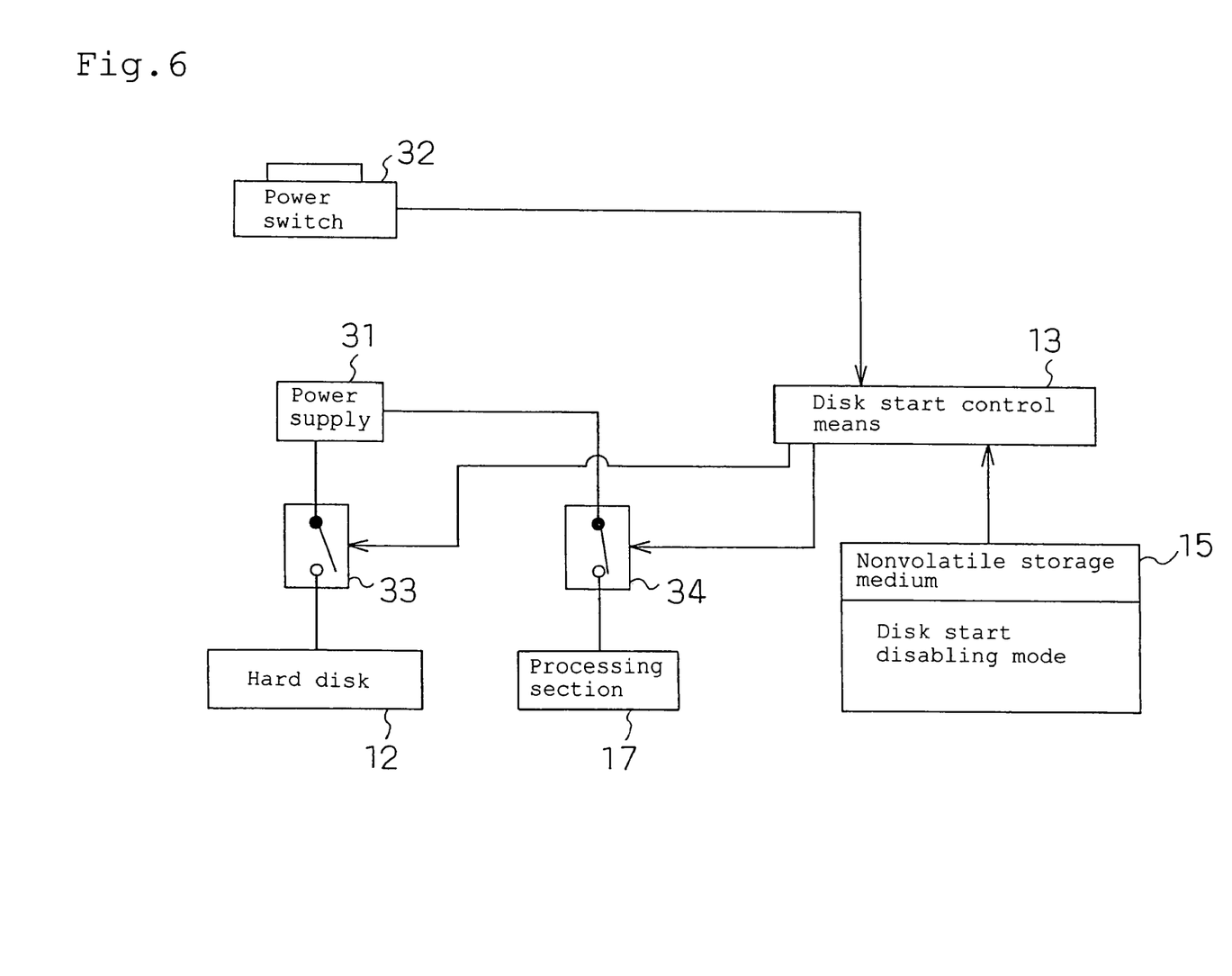
FIG. 6 is a view showing an outline of the power supply of the disk apparatus and sections relating to the power supply in accordance with the embodiment of the present invention.

Next, the disk apparatus shown in FIG. 5 is transported to the house of the user. The user unpacks the transported disk apparatus and connects its power plug, not shown, of the power supply 31 to a commercial power supply. Then, the user presses the power switch 32 to set the power switch 32 in the ON state. FIG. 6 shows the state of the disk apparatus immediately after the power switch 32 is set in the ON state. In FIG. 6, when the power switch 32 is set in the ON state, the disk start control means 13 operates according to the flowcharts illustrated in FIGS. 2 and 3. The disk start disabling mode has been stored in the nonvolatile storage medium 15 shown in FIG. 6. In FIG. 6, the switch 33 is in the non-conduction state, and the switch 34 is in the conduction state. In other words, electric power is not supplied to the hard disk 12, but electric power is supplied to the processing section 17. That is to say, in the case when the user sets the power switch 32 in the ON state for the first time after the shipment from the plant, the hard disk 12 is not started, but only the processing section 17 is started.

In this state, the user carries out operation, such as the operation of installing the disk apparatus at a desired installation place, the operation of connecting the antenna and the monitor to the disk apparatus and the operation of receiving signals of the tuner of the disk apparatus. In the state shown in FIG. 6, since the hard disk 12 is not started, even when this kind of operation is carried out, the reliability of the hard disk 12 is not damaged, except when very large impact is applied. Hence, the user can carry out this kind of operation without anxiety.

Next, when this kind of installation operation is completed, the user operates the GUI 21 shown in FIG. 4, for example, and selects the enabling 22 and then selects the OK 24. As a result, the disk start-enabling/disabling mode information is set in the disk start enabling mode. After this kind of operation, the user sets the power switch 32 in the OFF state. In other words, the start of the disk apparatus is stopped.

Figure 7:
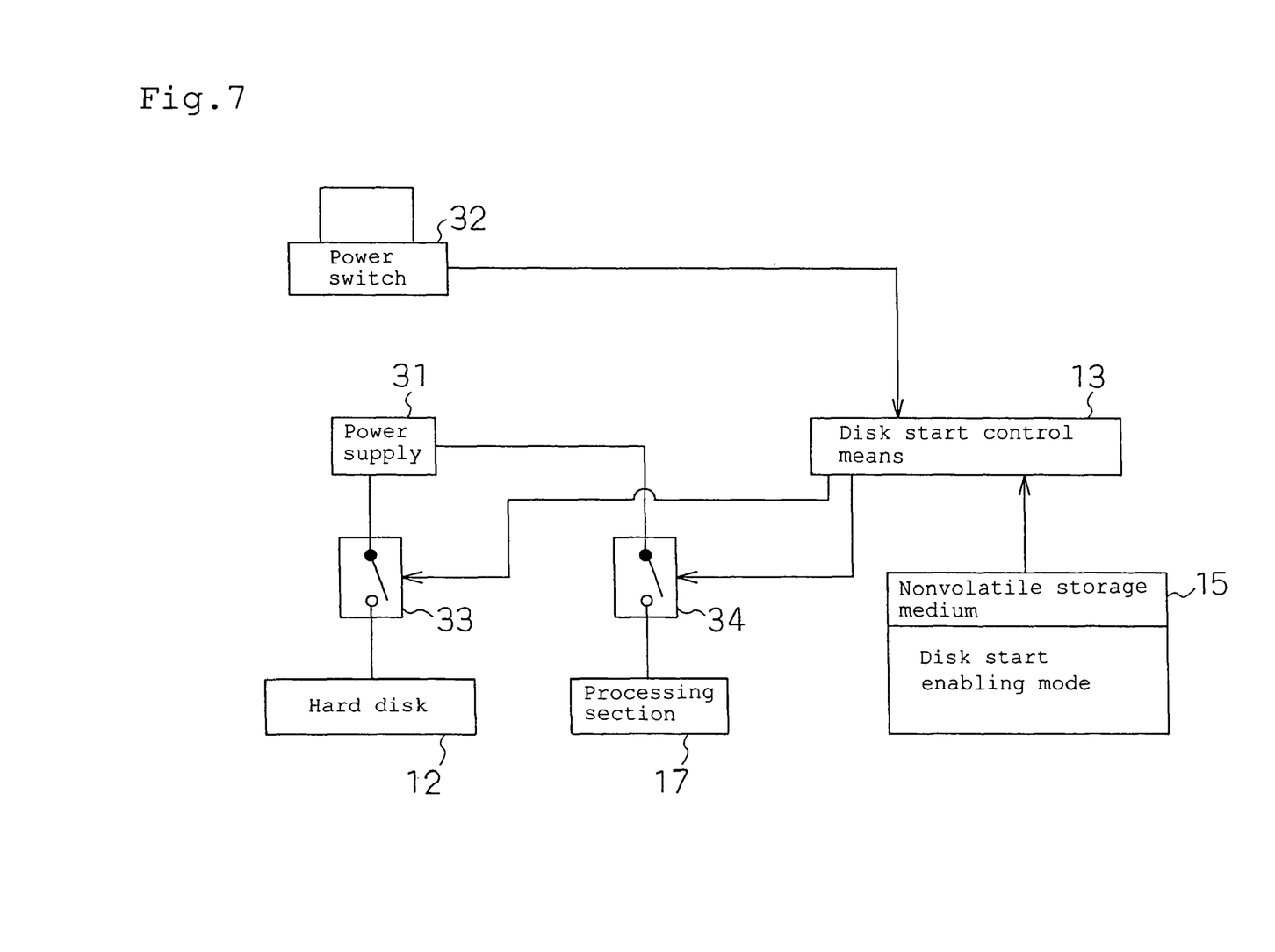
FIG. 7 is a view showing an outline of the power supply of the disk apparatus and sections relating to the power supply in accordance with the embodiment of the present invention.

FIG. 7 shows the state of the disk apparatus at the time when the installation operation by the user is completed, the disk start enabling/disabling mode information is set in the disk start enabling mode, and the power switch 32 is set in the OFF state. In FIG. 7, the power switch 32 is in the OFF state, and the switches 33 and 34 are both set in the non-conduction state. In addition, the disk start enabling mode is stored in the nonvolatile storage medium 15.

Figure 8:
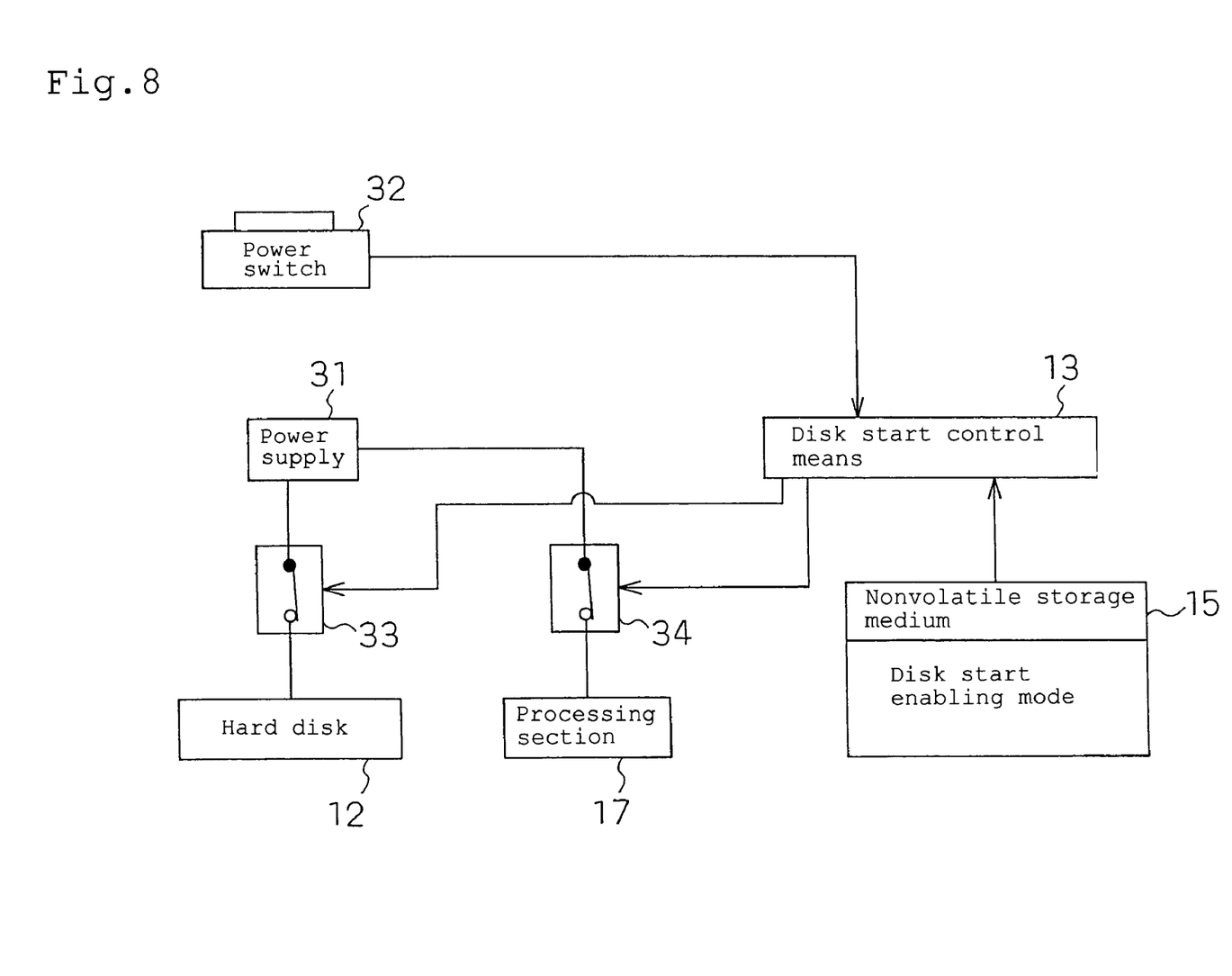
FIG. 8 is a view showing an outline of the power supply of the disk apparatus and sections relating to the power supply in accordance with the embodiment of the present invention.

Next, when the user uses the disk apparatus, the user sets the power switch 32 in the ON state to receive broadcasting at the processing section 17 of the disk apparatus and to record the broadcasting received at the processing section 17 on the hard disk 12. As a result, the disk apparatus operates in accordance with the flowchart shown in FIG. 3, and the disk apparatus is set in the state shown in FIG. 8. In FIG. 8, the power switch 32 is in the ON state, and the switch 33 and the switch 34 are both set in the conduction state. In addition, the disk start enabling mode is stored in the nonvolatile storage medium 15 as the disk enabling/disabling mode information. In other words, in the state shown in FIG. 8, when the power switch 32 is set in the ON state, both the hard disk 12 and the processing section 17 are started. As a result, the user can receive broadcasting and record the received broadcasting on the hard disk 12 using the disk apparatus. How the disk apparatus is used has been described above in time series.

A hard disk apparatus equipped with a tuner function is available as an example of this kind of disk apparatus. In the case when the user purchases a disk apparatus, such as a hard disk apparatus equipped with a tuner function, the user first carries out the installation of the purchased disk apparatus.

The user carries out operation, such as the operation of installing the disk apparatus at a desired installation place, the operation of connecting the antenna and the monitor to the disk apparatus and the operation of receiving signals of the tuner of the disk apparatus. The power supply of the disk apparatus is required to be set in the ON state when this kind of operation is carried out.

Even in the case when this kind of operation is carried out, the user can carry out the above-mentioned operation without starting the hard disk 12 of the disk apparatus by carrying out the operation described in the above-mentioned FIGS. 2 and 3. Hence, even if large impact is applied to the disk apparatus during the operation, the hard disk 12 can be protected safely.

Furthermore, at the time of the production shipment, the disk apparatus is set in the shipment setting mode in the production shipment stage as described above; hence, in the case when the power supply of the disk apparatus is set in the ON state for the first time after the production shipment, the above-mentioned disk start enabling/disabling mode information is forcibly set in the disk start disabling mode.

Hence, in the case when the power supply of the disk apparatus is set in the ON state for the first time for the user to carry out the installation operation, the disk start enabling/disabling mode information is set in the disk start disabling mode; hence, the user can begin to carry out the installation operation immediately without carrying out the operation of setting the disk start enabling/disabling mode information of the disk apparatus in the disk start disabling mode.

Then, at the time when the installation operation is completed, the user sets the disk start enabling/disabling mode information in the disk start enabling mode, whereby video, audio, etc. can be recorded and reproduced on the hard disk 12.

As described above, in accordance with this embodiment, at the time the starting of the hard disk 12 is not desired such as the time of the installation operation of the disk apparatus, the start of the hard disk 12 is disabled; after the completion of the installation, the start of the hard disk 12 is enabled so that the hard disk 12 can be used, whereby the hard disk 12 can be protected during the installation operation.

As described above, the disk apparatus described in FIGS. 5 to 8 is a disk apparatus wherein the command of rotating the magnetic disk media of the hard disk 12 of the disk apparatus is issued automatically when the power supply 31 is applied to the hard disk 12, and the magnetic disk media of the hard disk 12 rotates according to this command when the power supply 31 is applied to the hard disk 12. By carrying out the above-mentioned setting, the disk apparatus can be protected safely during the installation operation of this kind of disk apparatus. In the case when the disk apparatus in accordance with the present invention is this kind of disk apparatus, the starting of the disk section in accordance with the present invention means the setting of the power supply of the disk section in accordance with the present invention in the ON state.

In this embodiment, as described in FIGS. 5 to 8, the disk apparatus wherein the command of rotating the magnetic disk media of the hard disk 12 of the disk apparatus is issued automatically when the power supply 31 is applied to the hard disk 12, and the magnetic disk media of the hard disk 12 rotates according to this command when the power supply 31 is applied to the hard disk 12 is described; however, the present invention is not limited to this. In various types of disk apparatuses described below, the disk apparatuses can be protected safely during the installation operation.

In other words, in the case when the disk apparatus is a disk apparatus wherein the command of rotating the magnetic disk media of the hard disk 12 of the disk apparatus is not issued automatically when the power supply 31 is applied to the hard disk 12, a command of rotating the magnetic disk media may be issued occasionally at unexpected timing. Hence, even in the case of this kind of disk apparatus, by not supplying electric power to the hard disk 12 of the disk apparatus during the installation operation, just as in the above-mentioned case, the disk apparatus can be protected safely during the installation operation. Therefore, in the case when the disk apparatus in accordance with the present invention is this kind of disk apparatus, the starting of the disk section in accordance with the present invention means the setting of the power supply of the disk section in accordance with the present invention in the ON state.

Furthermore, in the case when the disk apparatus is the disk apparatus wherein the command of rotating the magnetic disk media of the hard disk 12 of the disk apparatus is not issued automatically when the power supply 31 is applied to the hard disk 12, the disk apparatus can also be protected safely during the installation operation of the disk apparatus by using a method different from the method described in FIGS. 5 to 8. In other words, unlike the method described in FIGS. 5 to 8, the power supply 31 is applied to the hard disk 12 when the installation operation of the disk apparatus is carried out. However, in the case when the power supply 31 is applied to the hard disk 12 during the installation operation, if a command of rotating the magnetic disk media is issued at unexpected timing, the disk apparatus cannot be protected safely. Hence, in this kind of disk apparatus, the disk apparatus is prevented from issuing the command of rotating the magnetic disk media of the hard disk 12 during the installation operation. In this way, even when the power supply 31 is applied to the hard disk 12 during the installation operation, the command of rotating the magnetic disk media of the hard disk 12 is not issued, and the magnetic disk media of the hard disk 12 is not rotated. Therefore, the disk apparatus can be protected during the installation operation. Hence, in the case when the disk apparatus in accordance with the present invention is this kind of disk apparatus, the starting of the disk section in accordance with the present invention means causing the rotation of the media of the disk section in accordance with the present invention after the power supply of the disk section in accordance with the present invention is set in the ON state.

Still further, in the case of a disk apparatus wherein until a command of rotating media, such as the magnetic disk media of the hard disk 12, is issued, the media is not rotated even when the power supply of the disk apparatus is set in the ON state, and furthermore in the case when this disk apparatus has a mechanism that makes the movement of the disk head easier by the setting of the power supply of the hard disk 12 in the ON state than in the case when the power supply of the hard disk 12 is set in the OFF state, the hard disk 12 can be protected during the installation operation by not supplying electric power to the hard disk 12 during the installation operation, whereby the reliability of the hard disk 12 can be improved. Therefore, in the case when the disk apparatus in accordance with the present invention is this kind of disk apparatus, the starting of the disk section in accordance with the present invention means an action wherein the disk head of the disk section in accordance with the present invention moves more easily by the setting of the power supply of the disk section in accordance with the present invention in the ON state than in the case when the power supply of the disk head of the disk section in accordance with the present invention is set in the OFF state.

In the above-mentioned embodiment, even after the above-mentioned disk start enabling/disabling mode information is set in the "disk start enabling mode" once, the disk start enabling/disabling mode information can be set in the "disk start disabling mode" again by key input operation by the user; hence, in the case when the installation operation or the like is carried out again, the operation can be carried out without anxiety by simply setting the start mode of the hard disk 12 in the disk start disabling mode.

In addition, the disk apparatus in accordance with the present invention is not limited to the disk apparatus comprising, in accordance with the embodiment, the processing section 17 having the function of the tuner and the hard disk 12. The processing section 17 may have the function of a tuner of receiving broadcasting and the function of an optical disk section of recording and/or reproducing the received broadcasting on optical disk media, and the hard disk 12 may be a DVD recorder having the function of carrying out recording and/or reproduction on optical disk media. Furthermore, the processing section 17 may have the function of a tuner of receiving broadcasting and the function of a display section of displaying the received broadcasting on a display, such as a liquid crystal display, and the hard disk 12 may be a television set having the function of carrying out recording and/or reproduction on magnetic disk media.

After all, the disk apparatus in accordance with the present invention should only be an apparatus having a disk section being less resistant against impact at the time when the media of the disk section in accordance with the present invention are rotating than at the time when the media of the disk section in accordance with the present invention are not rotating, and the processing section in accordance with the present invention should only perform any given functions other than those of the disk section in accordance with the present invention.

As described above, in accordance with this embodiment, in the production shipment stage of the disk apparatus, the disk start enabling/disabling mode information of the hard disk 12 is set in the disk start disabling mode, and after the installation operation of the disk apparatus is completed by the user who purchased the apparatus, the setting of the disk start enabling/disabling mode information of the hard disk 12 is changed to the disk start enabling mode, that is, the state wherein ordinary operation can be carried out, by definite user operation, whereby even in the case when impact is applied to the disk control apparatus during the above-mentioned installation operation, damage to the hard disk 12 can be eliminated by disabling the start of the hard disk 12, except when very large impact is applied.

In other words, by setting the start mode of the hard disk 12 of a hard disk apparatus or the like in the "disk start disabling mode" in the production shipment stage, even when the user carries out ordinary power ON operation during installation operation or the like for the first time after the purchase, since the above-mentioned disk start enabling/disabling mode information has already been set in the "disk start disabling mode" in the production shipment stage, the hard disk 12 is not started, whereby even if impact or vibration to the hard disk 12 is applied during the above-mentioned installation operation, damage to the hard disk 12 can be eliminated except when very large impact is applied; hence the reliability of the hard disk 12 can be secured. Furthermore, even after the above-mentioned disk start enabling/disabling mode information is changed to the "disk start enabling mode" once, by changing the setting to the "disk start disabling mode" again, a similar effect can be obtained even during the re-installation operation after the purchase.

In addition, the program of the present invention is a program that makes a computer carry out the operations of all or part of the steps (or processes, operations, actions, etc.) of the above-mentioned control method of the disk apparatus in accordance with the present invention and operates in cooperation with the computer.

Furthermore, the recording medium of the present invention is a recording medium having a program that makes a computer carry out all or part of the operations of all or part of the steps (or processes, operations, actions, etc.) of the above-mentioned control method of the disk apparatus in accordance with the present invention, the medium is readable by the computer, and the above-mentioned program having been read is used to carry out the above-mentioned operations in cooperation with the above-mentioned computer.

Still further, the above-mentioned "part of the means (or apparatuses, devices, etc.)" of the present invention means one or several means in the plural means thereof, and the above-mentioned "part of the steps (or processes, operations, actions, etc.)" of the present invention means one or several steps in the plural steps thereof.

Still further, the above-mentioned "the functions of the means (or apparatuses, devices, etc.)" of the present invention mean all or part of the functions of the above-mentioned means, and the above-mentioned "the operations of the steps (or processes, operations, actions, etc.)" of the present invention mean operations at all or part of the above-mentioned steps.

Still further, one utilization form of the program of the present invention may be an embodiment that is recorded on a recording medium readable by a computer and operates in cooperation with the computer.

Still further, another utilization form of the program of the present invention may be an embodiment that is transmitted through a transmission medium, is read by a computer and operates in cooperation with the computer.

Still further, the data structure of the present invention includes database, data format, data table, data list, data type, etc.

Still further, the recording medium includes ROM and the like, and the transmission medium includes a transmission medium, such as the Internet, light, electric wave, sound wave, etc.

Still further, the above-mentioned computer of the present invention is not limited to pure hardware, such as a CPU, but may include firmware, OS and peripheral devices.

Still further, as described above, the configuration of the present invention may be attained by software or by hardware.

As clarified by the above-mentioned descriptions, the present invention can provide a disk apparatus, a disk apparatus controlling method, a program and a recording medium, capable of securing the reliability of the disk section, even in the case when large impact is applied during the installation operation of the disk apparatus.

The invention claimed is:

1. A disk apparatus comprising:
a disk section of recording and/or reproducing at least one of video, audio or data,
a processing section of processing at least one of said video, audio or data,
a disk start controller which controls said disk section and said processing section,
a storage section of storing a flag indicating one of: a disk start disabling mode in which said disk section is not powered ON responsive to the disk apparatus being powered ON, or a disk start enabling mode in which said disk section is powered ON responsive to the disk apparatus being powered ON; and
a disk start mode setting section of setting the flag to indicate the disk start disabling mode prior to installation of the disk apparatus and setting the flag to indicate the disk start enabling mode subsequent to installation of the disk apparatus, and
wherein said disk start controller, responsive to the disk apparatus being powered ON,
(1) applies power to said processing section without applying power to said disk section when the flag indicates said disk start disabling mode, and
(2) applies power to said disk section and said processing section when the flag indicates said disk start enabling mode,
wherein when power is applied to the processing section, the processing section is able to process the at least one of said video, audio or data.

2. A disk apparatus in accordance with claim 1, wherein said disk start mode setting section is set in said disk start disabling mode in a production shipment stage.

3. A disk apparatus in accordance with claim 1, wherein said disk section is a hard disk to carry out recording and/or reproduction on magnetic disk media.

4. A disk apparatus in accordance with claim 3, wherein a safety zone of said hard disk is present on said magnetic disk media.

5. A disk apparatus in accordance with claim 1, wherein said processing section is a tuner to receive broadcasting.

6. A disk apparatus in accordance with claim 3, wherein:
the disk apparatus serves as a recorder equipped with a hard disk; and
said processing section is a tuner receiving broadcasting.

7. A disk apparatus in accordance with claim 3, wherein:
the disk apparatus serves as a DVD recorder equipped with a hard disk; and
said processing section is (1) a tuner receiving broadcasting and (2) an optical disk section recording and/or reproducing said broadcasting received on an optical disk.

8. A disk apparatus in accordance with claim 3, wherein:
the disk apparatus serves as a television set equipped with a hard disk; and
said processing section is (1) a tuner receiving broadcasting and (2) a display section displaying said broadcasting received.

9. A disk apparatus controlling method of:
controlling a disk apparatus comprising a disk section of recording and/or reproducing at least one of video, audio or data, a processing section of processing said video, audio or data, a storage section of storing a flag indicating one of a disk start disabling mode in which said disk section is not powered ON responsive to the disk apparatus being powered ON, or a disk start enabling mode in which said disk section is powered ON responsive to the disk apparatus being powered ON, and a disk start mode setting section of setting the flag to indicate the disk start disabling mode prior to installation of the disk apparatus and setting the flag to indicate the disk start enabling mode subsequent to installation of the disk apparatus,
wherein responsive to the disk apparatus being powered ON, a disk start controller:

(1) applies power to said processing section without applying power to said disk section when the flag indicates said disk start disabling mode, and (2) applies power to said disk section and said processing section when the flag indicates said disk start enabling mode, wherein when power is applied to the processing section, the processing section is able to process the at least one of said video, audio or data.

10. A program of making a computer carry out said control steps of said disk apparatus controlling method in accordance with claim 9, wherein at the time when power ON operation is carried out, in the case (1) when said storage section stores the flag indicating said disk start disabling mode, control is carried out so as to apply power to said processing section without applying power to said disk section, and in the case (2) when said storage section stores the flag indicating said disk start enabling mode, control is carried out so as to apply power to said disk section and said processing section.

11. A non-transitory recording medium holding said program in accordance with claim 10, said recording medium being processable by a computer.

12. A disk apparatus in accordance with claim 1, wherein the flag corresponds to mode information and wherein the mode information indicating said disk start disabling mode is set in the disk start mode setting section responsive to installation of the disk apparatus and is reset to the mode information indicating said disk start enabling mode after the installation of the disk apparatus.

13. A disk apparatus in accordance with claim 12, wherein the disk apparatus is configured to accept input from a user to reset the stored mode information to indicate said disk start enabling mode after the installation of the disk apparatus.

14. A disk apparatus in accordance with claim 1, wherein said disk start mode setting section has
   (1) a first function in which said operating mode of the disk section is set to any one of said disk start disabling mode and said disk start enabling mode, and
   (2) a second function in which said operating mode of the disk section is set to only said disk start disabling mode.

15. A disk apparatus in accordance with claim 9, wherein said disk start mode setting section has
   (1) a first function in which said operating mode of the disk section is set to any one of said disk start disabling mode and said disk start enabling mode, and
   (2) a second function in which said operating mode of the disk section is set to only said disk start disabling mode.

16. A disk apparatus in accordance with claim 12, wherein said disk start mode setting section has
   (1) a first function in which said operating mode of the disk section is set to any one of said disk start disabling mode and said disk start enabling mode, and
   (2) a second function in which said operating mode of the disk section is set to only said disk start disabling mode.

17. A disk apparatus in accordance with claim 13, wherein said disk start mode setting section has
   (1) a first function in which said operating mode of the disk section is set to any one of said disk start disabling mode and said disk start enabling mode, and
   (2) a second function in which said operating mode of the disk section is set to only said disk start disabling mode.

* * * * *